Patented Mar. 11, 1930

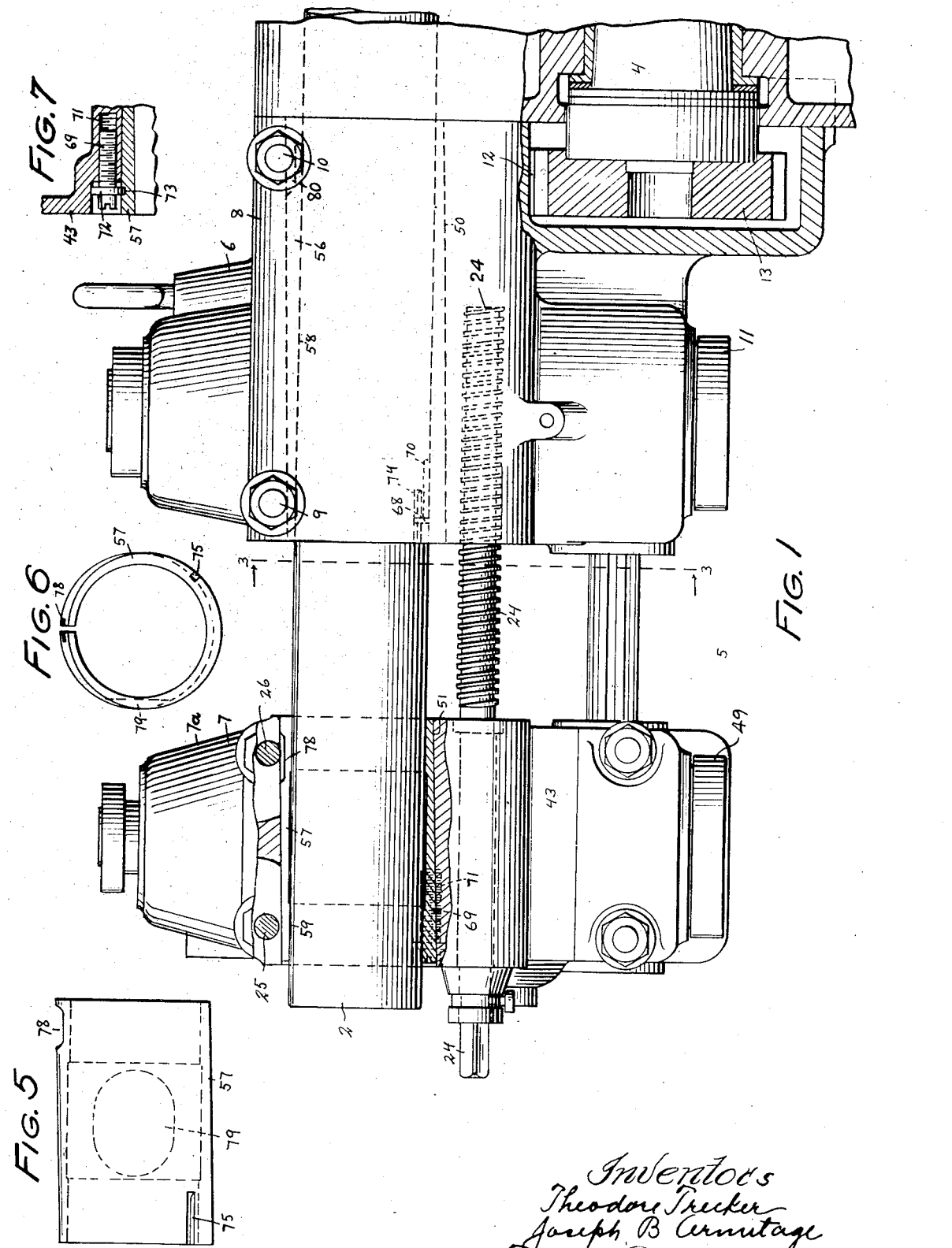

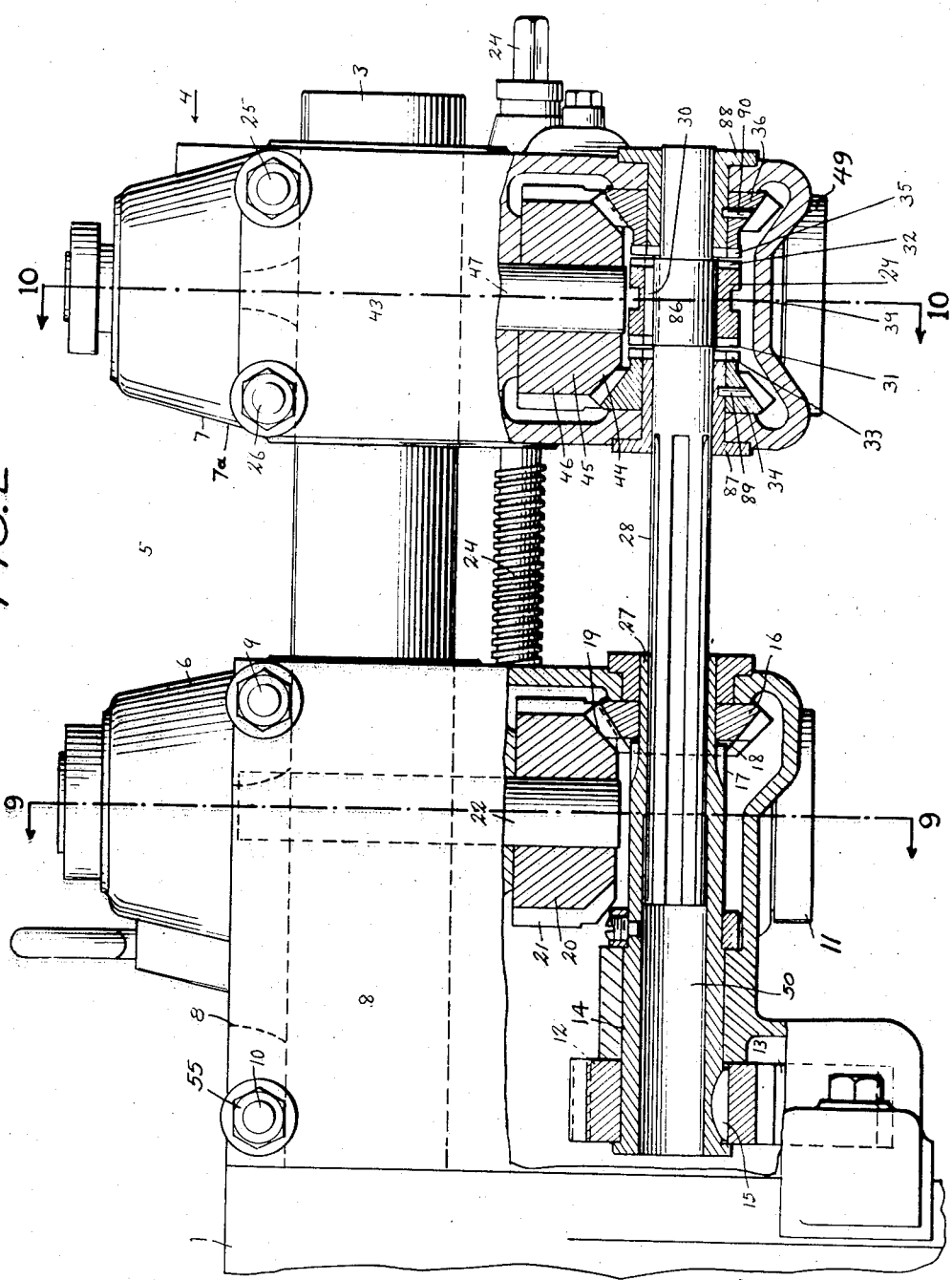

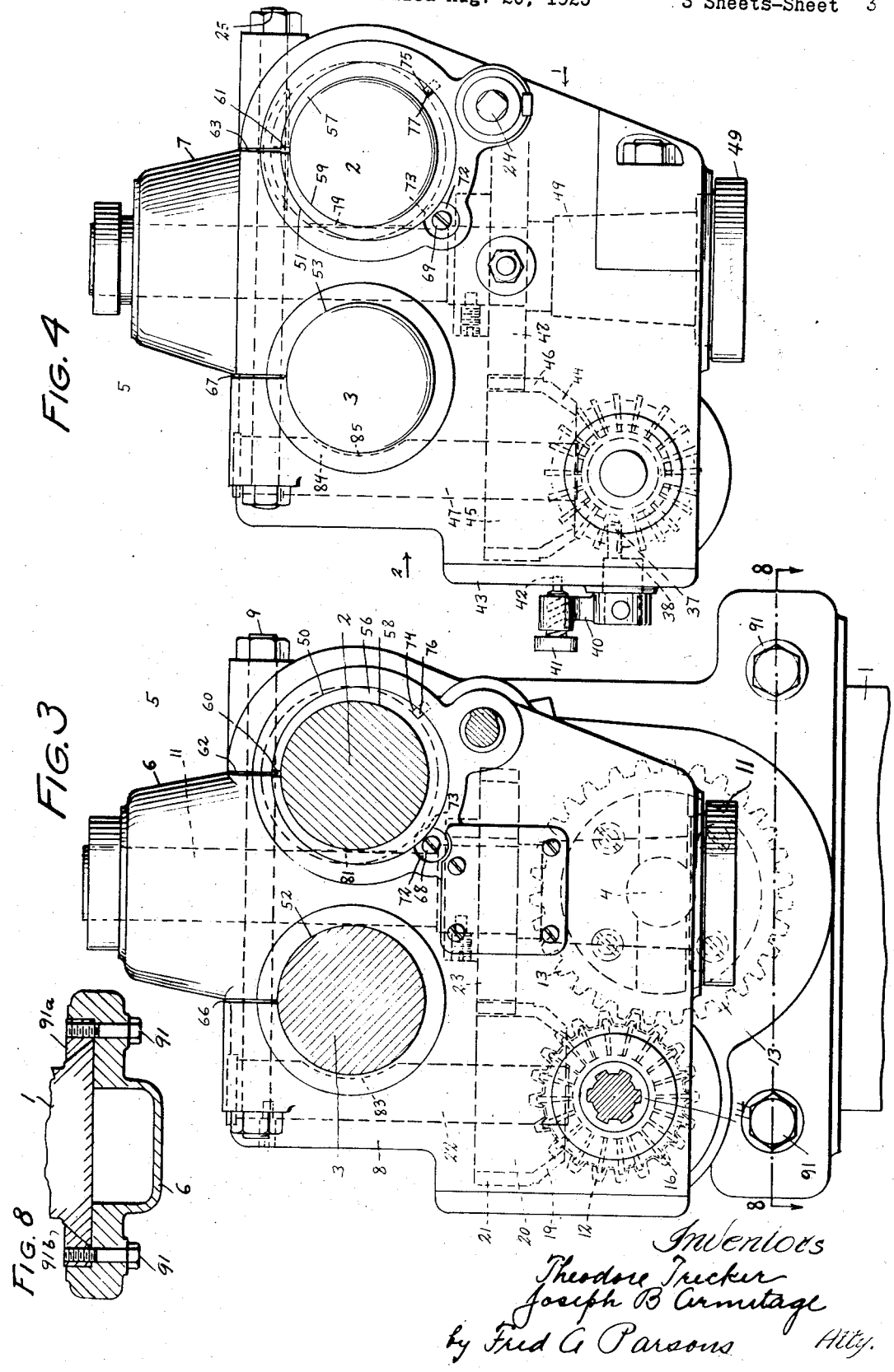

1,750,373

UNITED STATES PATENT OFFICE

THEODORE TRECKER AND JOSEPH B. ARMITAGE, OF MILWAUKEE, WISCONSIN, ASSIGNORS TO KEARNEY & TRECKER CORPORATION, OF WEST ALLIS, WISCONSIN

ATTACHMENT FOR MACHINE TOOLS

Application filed August 20, 1925. Serial No. 51,316.

This invention relates to attachments for machine tools and the object of the invention is generally to simplify and improve the construction and operation of attachments for machine tools and thereby increase the utility.

Referring to the drawings which accompany this specification and form a part hereof, which drawings illustrate an embodiment of this invention, and on which drawings the same reference characters are used to designate the same parts, Fig. 1 is an elevation of part of a milling machine with the attachment secured thereto, looking in the direction of the arrow numbered 1 on Fig. 4, parts being shown in section; Fig. 2 is an elevation of part of the milling machine with the attachment secured thereto, looking in the direction indicated by the arrow marked 2 on Fig. 4, parts being shown in section; Fig. 3 is a section taken on the line 3—3 on Fig. 1 looking in the direction indicated by the arrows; Fig. 4 is an end elevation looking in the direction indicated by the arrow marked on Fig. 2; Fig. 5 is a plan view of a part; Fig. 6 is an end elevation of a part; Fig. 7 is a section of parts, and Fig. 8 is a reduced section along line 8—8 of Fig. 3.

Referring to the drawings, the reference numeral 1 designates the vertical column of a milling machine which supports a plurality of parallel overarms 2 and 3 and which is provided with a rotatable spindle 4 for a tool arbor, not shown, in many uses of the milling machine. It will be understood that the column 1 is part of a milling machine which includes in its construction a vertical column and a vertically movable knee upon which may be mounted a saddle and a table for holding and moving the work to be milled, and suitable drive mechanism for spindle 4, including some form of a reversing mechanism. Milling machines which embody in their construction the parts herein before mentioned are well known and these parts can be of any preferred construction.

The overarms 2 and 3 are removably retained in their positions in the column 1 in a well known manner and the overarms are utilized for adjustably supporting an attachment which will now be described.

The attachment, which, as a matter of convenience, is designated generally by the reference numeral 5, preferably comprises a plurality of units 6 and 7 so as to provide for relative adjustability as between the units lengthwise of the overarms. The unit 6 comprises a casing or housing 8 which is adapted to be clamped to the overarms 2 and 3 by bolts 9 and 10 the casing being split or slotted at 62 and 66 to facilitate clamping and is downwardly extended to bear against or frictionally engage with the knee-face of the column 1. The casing 8 supports a vertical spindle 11 to the lower end of which a suitable milling tool, not shown, may be secured, this vertical spindle 11 is preferably located between the overarms 2 and 3 and is rotated from the spindle 4 in the following manner. The casing 8 supports a gear 12 which meshes with a gear 13 secured to the spindle 4 in place of and instead of a tool arbor and which provides a single source for actuating a tool spindle in each of the attachment units as will be described. When the spindle 4 is being rotated the gear 13 will rotate with it and rotate gear 12 and gear 12 will rotate the hollow shaft 14 to which it is secured by a key 15. The hollow shaft 14 has a bevel gear 16 secured thereto by intermeshing teeth 17 and 18 and the bevel gear 16 meshes with the bevel gear part 19 of a gear 20 which is also provided with a spur gear part 21. The gear 20 can rotate on a vertical stud 22 fixed in the housing and the spur gear part 21 of the gear 20 meshes with a spur gear 23 secured to the vertical spindle 11. It will be understood that the direction of rotation of the vertical spindle 11 will depend upon the direction of rotation of the spindle 4 and it will also be understood that mechanism is provided in milling machines, of the type herein referred to, by means of which the direction of rotation of the spindle 4 can be controlled, or reversed.

The unit 7 is connected with the unit 6 by means of a screw 24 so that the unit 7 can be spaced the required distance from the unit 6 for the work to be performed. The unit 7 can be clamped upon the overarms 2 and 3 by the bolts 25 and 26 after it has been properly positioned by means of the screw 24, the casing or housing 7A of unit 7 being split or slotted at 63 and 67 to facilitate clamping. A previous application, Serial No. 672,227 filed Nov. 1, 1923, is directed toward similar mechanism for adjusting and clamping a similar unit. The hollow shaft 14 is provided with a fluted or splined part 27 at its outer end and a co-acting exteriorly fluted or splined shaft 28 is journaled in the unit 7 and forms an extension of the shaft 14 so as to be rotated thereby while being adapted to be moved inwardly or outwardly with respect thereto, the bore of the shaft 14 forming a space for receiving shaft 28 and the two shafts together coacting to form a collapsible driving member for the spindle of the movable unit 7. The shaft 28 has a clutch member 29 keyed thereto by a key 30 so that the clutch member 29 is movable longitudinally of the shaft 28 but is compelled to rotate therewith. The clutch member 29 is provided with clutch teeth 31 and 32 and the clutch member 29 can be moved into positions longitudinally of the shaft 28 to engage clutch teeth 33 on a bevel gear 34 or clutch teeth 35 on a bevel gear 36 or so that it will occupy an intermediate or neutral position without its clutch teeth being engaged with either the clutch teeth 33 on the bevel gear 34 or the clutch teeth 35 on the bevel gear 36, as will be readily understood from an inspection of Fig. 2 of the drawings. The clutch member 29 is positioned by a shifting crank which may be an eccentrically located pin 37 projecting from the shaft 38 into the circumferential groove 39 in the clutch member 29. The shaft 38 is provided with a handle 40 which can be held in one of its predetermined positions by a screw or plunger member 41 engaging in one of a plurality of holes 42 in the casing 43 of the unit 7. The bevel gears 34 and 36 mesh with the bevel gear part 44 of a gear 45 which is also provided with a spur gear part 46 and which can rotate on a vertical shaft or stud 47 fixed in the housing. The spur gear part 46 of the gear 45 meshes with a spur gear 48 secured to a vertical spindle 49.

It will be apparent that the directions of rotation of the vertical spindles 11 and 49 are governed, in the first instance, by the directions of rotation of the spindle 4, and that the clutch member 29 provides means whereby the vertical spindle 49 may be rotated in the same direction as the vertical spindle 11, or in the opposite direction, the bevel gears 34 and 36 together with associated mechanism forming a reverser effective only on that branch of the transmission which leads to spindle 49 although both spindles are driven from a common source.

It is sometimes desirable to tilt one or both of the vertical spindles 11 and 49 a trifle so as to present tools carried thereby angularly to the work, more especially in order that the rear cutter portions last to pass over the work do not drag or tend to mar the work surface finished by the forward cutter portions, and means for this purpose will now be described. The bores 50 and 51 in the units 6 and 7 for the overarm 2, are not concentric with the overarm 2, their axis being tilted from the plane common to both overarm axes, while the bores 52 and 53 for the overarm 3 are concentric with the overarm 3.

This construction pivots the units 6 and 7 upon the overarm 3. The required tilting of the spindles in either direction is very slight in amount and shaft 28 has sufficient play in the shaft 14 to permit of the limited tilting movements necessary, and the screw 24 also has sufficient play to permit of the extent of tilting movements permitted by the shafts 28 and 14. Bushings or wedge members 56 and 57 are provided with bores 58 and 59 concentric with the overarm 2 and their exteriors fit the bores 50 and 51. The wedge members 56 and 57 are formed as split bushings and their splits 60 and 61 are in registry with the splits 62 and 63 in the units 6 and 7, whereby the clamp bolts may act to clamp the respective members in their various positions of adjustment and simultaneously clamp the respective casings with both overarms. By moving the bushing or wedge members 56 and 57 in their respective bores in the units 6 and 7, a unit, or both units, can be adjusted around the overarm 3, as a pivot. either in the same direction or in opposite directions. Moving a bushing only moves that unit with which it coacts. The specific construction and operation of the bushings 56 and 57 which are illustrated by the drawings can be readily understod by regarding the bushings 56 and 57 as cylinders which fit into cylindrical bores 50 and 51, and which are provided with cylindrical bores 58 and 59 for the overarm 2, the axes of the bores being in the same vertical plane which includes, longitudinally, the axis of the overarm 2, but the axes of the bores 58 and 59 being inclined in a horizontal plane.

In practice, the bushings 56 and 57 are only moved when the bolts 9 and 10, or the bolts 25 and 26 have been loosened, depending on which bushing is to be moved. Any suitable means can be provided for moving the bushings but some kind of screw mechanism is preferable on account of ease and accuracy of adjustment. The drawings illustrate screws 68 and 69 which engage with screw threaded bores 70 and 71 in the casings 8 and 43 of the units 6 and 7. Each of the screws 68 and 69 is provided with a flange 72 which extends into a recess 73 in the bushing with which it coacts and it will be readily understood from an inspection of Fig. 7 of the drawings, that rotating a screw 68 or 69 will move the screw in or out with respect to its screw threaded bore and move the coacting bushing with it. The bushings 56 and 57 may be provided with longitudinal keyways 74 and 75 for keys 76 and 77 to prevent rotational movements of the bushings while permitting longitudinal movements thereof. The bushings and associated parts are so proportioned that when the bushings are in their one extreme of adjustment the spindle associated therewith is tilted in the one direction from the exact vertical and when the bushings are in their opposite extreme of adjustment the spindles are tilted in the opposite direction. Thus a central position of bushing adjustment approximately corresponds to and produces an exactly vertical position of the spindles.

The bushings 56 and 57 are illustrated by the drawings as duplicates in general construction. The bushing 57 is illustrated by Figs. 5 and 6 of the drawings in longitudinal elevation and in end elevation and is cut away at 78 for clearance for the bolt 26 and at 79 for the spindle 49 and, in like manner, the bushing 56 is cut away at 80 for the bolt 10 and at 81 for the spindle 11. The studshaft 22 is also cut away at 83 for clearance of the overarm 3. In like manner, the studshaft 47 is cut away at 85 for clearance of the overarm 3. These clearances have nothing to do with the principles of construction and operation of the mechanism but simply provide for a compact arrangement of the parts.

The shaft 28 is retained longitudinally in position with respect to the unit 7 by an enlarged part 86 and the flanged bushings 87 and 88 which are secured to the bevel gears 34 and 36 by the pins 89 and 90. The unit 6 can be rigidly clamped with the column 1 by means of suitable shim or gib members 91ª and 91ᵇ which are provided with bolts 91. This arrangement permits of the tilting of the spindle and both gibs may be removed to slide the unit 8 along the overarms when the unit is to be removed from the machine.

The position of the spindles 11 and 49 central between a plurality of overarms equally spaced from the vertical plane of the axis of the machine spindle 4 is of considerable importance. The machines upon which attachments of this nature are adapted for use are almost invariably constructed with movements of adjustment of equal extent in each longitudinal direction from the main or machine spindle 4. In the case that a single overarm is used it is necessarily for such machines located with its axis in the same vertical plane as spindle 4 which necessitates offsetting the vertical attachment spindles to the one side or the other of such a single overarm thus creating a structure having unequal movement of longitudinal work adjustment relative to the attachment tool spindles and of unequal rigidity for resisting cutting strains in opposite longitudinal directions. By the construction shown such defects are avoided.

It is likewise of considerable importance that the spindle supporting structure should extend well downward from the overarms in a position to give maximum support to the spindle in the position of normal use which is approximately the position as shown in the drawings.

It is to be noted that the combination of the attachment spindle supporting housing 7ª with the overarms is such that the overarms form a slide or guide upon which the unit 7 may be slidably adjusted, this arrangement being extremely simple and effective for rigidly supporting the unit 7 in its various positions of adjustment and for maintaining such alignments during adjustment. This arrangement is also of great convenience in positioning the unit 8 and supporting the unit when positioned.

The operation of the attachment will be readily understood from the foregoing description of its principles of construction and operation considered in connection with the drawings and the description of the mechanism illustrated by the drawings, and it will be readily apparent that the unit 7 can be separated from the unit 6 and the unit 6 used alone.

What is claimed is:

1. In an attachment for machine tools having a plurality of horizontal overarms spaced apart the combination of a structure mounted on and entirely supported from said overarms and a vertical spindle rotatably mounted in said structure, the axis of said spindle being positioned for a portion thereof to pass between the overarms, whereby said spindle has substantially equal resistance against pivoted movement about either arm.

2. In an attachment for machine tools having a plurality of parallel horizontal overarms the combination of a housing supported from said overarms, said overarms providing a slide for movement of said housing, a vertical spindle rotatably supported from said housing and having its axis passing between said overarms, and clamp means adapted to simultaneously frictionally engage said housing with each overarm with substantially equal pressure; whereby said spindle when clamped has substantially equal resistance against pivoted movement about either arm.

3. In an attachment for machine tools having a plurality of overarms, the combination of a tool supporting structure, said structure being formed with bearings arranged to receive said overarms, one of said bearings being pivotally mounted on one of said overarms, and adjusting means between said other overarm and its bearing, said adjusting means being adapted to be clamped to hold the tool tilted in various positions relative to the work.

4. In an attachment for machine tools having an overarm, the combination of a spindle supporting structure pivoted about the axis of said overarm, a spindle rotatably mounted in said structure, and spindle tilting means for movement of said structure about said pivot including an adjusting screw for determining the amount and direction of tilting movement.

5. In an attachment for machine tools having a plurality of overarms the combination of a plurality of tool spindles each rotatably supported between said overarms in relatively adjustable spindle supporting units whereby the one spindle may be bodily adjusted relative to the other, a transmission shaft journaled in the one unit, for actuating the spindle of the other unit and a transmission shaft supported in axial alignment therewith in said other unit and forming therewith a collapsible driving member.

6. In an attachment for machine tools having a column and a plurality of overarms the combination of a spindle supporting structure fixed with said overarms and having a downwardly projecting portion adapted for engagement with said column, and a spindle rotatably mounted in said support between said overarms to have its lower end projecting from said downwardly projecting portion.

7. In an attachment for machine tools having a plurality of overarms the combination of a plurality of spindle support units each pivoted about the axis of one of said overarms, independent spindle tilting devices associated with each of said units, and spindle transmission mechanism having a portion common to both said spindles.

8. In an attachment for machine tools having a plurality of parallel overarms the combination of a spindle support pivoted about the axis of one of said overarms and having a cylindrical bore having its axis tilted from the plane common to the axes of said overarms, and spindle tilting means including a bushing in said bore and having a cylindrical bore axially coinciding with the axis of the other overarm, and means for the movement of said bushing relative to said spindle support.

9. In an attachment for machine tools having an overarm and a column the combination of a spindle supporting structure supported from said overarm and having a portion adapted for engagement with the face of said column, said structure being supported for tilting movement relative to said column, and clamp means adapted to fix said portion against said column face in various positions of said tilting movement including a plurality of adjustable gibs respectively engaging opposite edges of the column face.

10. In an attachment for machine tools having an overarm and a column, the combination of a structure supported from said overarm and rotatably supporting a tool spindle, said structure including a portion adapted for engagement with the face of the column, spindle tilting means adapted to adjust said support, and a clamp adapted to fix said portion against said column face in various positions of tilted adjustment.

11. In an attachment for machine tools having a plurality of overarms, the combination of a plurality of rotatable spindles each having its axis positioned between said overarms, and independently operable spindle tilting devices respectively associated with the respective spindle, whereby each spindle may be tilted in either direction relative to said overarms.

12. In an attachment for machine tools having a plurality of overarms, the combination of a rotatable spindle having its axis positioned between said overarms, and spindle tilting means associated with said spindle and operable to determine the amount and direction of movement thereof relative to said overarms.

13. In an attachment for machine tools having a column, an overarm extending therefrom and a horizontal spindle journaled in said column and having an end exposed in the direction of said overarm extension, the combination of an attachment spindle supported from said overarm for movement relative to said column, and transmission mechanism therefor including in the order mentioned a member fixed with said exposed spindle end, a collapsible coupling, and a member fixed with said attachment spindle.

14. In an attachment for machine tools having a column, an overarm extending therefrom, and a horizontal spindle journaled in said column and having an end exposed in the direction of said overarm extension, the combination of a rotatable attachment spindle supported from said overarm for movement relative to said column, and transmission mechanism therefor including in the order mentioned a member fixed with said exposed spindle end, a collapsible coupling, a reverser and a member fixed with said attachment spindle.

15. In an attachment for machine tools having a column, a plurality of spaced overarms supported from said column and extending therefrom in a horizontal plane, and a horizontal spindle journaled in said column underneath said overarms and having an end exposed in the direction of overarm extension, the combination of a structure supported from said overarms, a vertical spindle journaled in said structure between said overarms, said structure having a portion extending downwardly from said overarms adjacent said exposed spindle end to engage with the column, and transmission mechanism for said vertical spindle including a member fixed on said exposed spindle and, a portion of said transmission being housed within said downwardly extending structure portion.

16. In an attachment for machine tools having a column and a horizontal overarm supported therefrom, the combination of a spindle carrier pivoted on said overarm, and a device for movement of said carrier about said pivot including means for determining the amount and direction of pivoted movement.

In witness whereof, we affix our signatures.
THEODORE TRECKER.
JOSEPH B. ARMITAGE.